US012800855B2

(12) United States Patent
Lin et al.

(10) Patent No.: US 12,800,855 B2
(45) Date of Patent: Nov. 17, 2026

(54) OPTICAL MODULE ASSEMBLY INCLUDING EXPOSED PARTS HAVING DIFFERENT VISUAL FEATURES

(71) Applicant: Global Technology Inc., Ningbo (CN)

(72) Inventors: Yi Lin, Ningbo (CN); Qilin Hong, Ningbo (CN); Taotao Ye, Ningbo (CN); Jiaxing Tong, Ningbo (CN)

(73) Assignee: Global Technology Inc., Ningbo (CN)

( * ) Notice: Subject to any disclaimer, the term of this patent is extended or adjusted under 35 U.S.C. 154(b) by 275 days.

(21) Appl. No.: 18/739,023

(22) Filed: Jun. 10, 2024

(65) Prior Publication Data

US 2025/0189736 A1 Jun. 12, 2025

(30) Foreign Application Priority Data

Dec. 8, 2023 (CN) ......................... 202323346677.4

(51) Int. Cl.
*G02B 6/42* (2006.01)
*G02B 6/38* (2006.01)

(52) U.S. Cl.
CPC ......... *G02B 6/4256* (2013.01); *G02B 6/4206* (2013.01); *G02B 6/428* (2013.01); *G02B 6/4284* (2013.01); *G02B 6/3895* (2013.01); *G02B 6/4292* (2013.01)

(58) Field of Classification Search
CPC .. G02B 6/3895; G02B 6/4206; G02B 6/4256; G02B 6/428; G02B 6/4284
See application file for complete search history.

(56) References Cited

U.S. PATENT DOCUMENTS

| | | | | |
|---|---|---|---|---|
| 11,609,390 | B2 * | 3/2023 | Khazen | G02B 6/406 |
| 2016/0054527 | A1 * | 2/2016 | Tang | G02B 6/3895 439/155 |
| 2017/0212315 | A1 * | 7/2017 | Kurashima | G02B 6/3893 |
| 2022/0077623 | A1 * | 3/2022 | Mizuno | G02B 6/4284 |

* cited by examiner

*Primary Examiner* — Daniel Petkovsek
(74) *Attorney, Agent, or Firm* — Secant IP, P.L.L.C.

(57) ABSTRACT

An optical module assembly including a root optical transceiver, a first branch optical transceiver, a second branch optical transceiver, a first exposed part and a second exposed part. The root optical transceiver includes a first housing, a first optical communication assembly and a second optical communication assembly. Each of the first branch optical transceiver and the second branch optical transceiver includes a second housing and a third optical communication assembly. The first optical communication assembly is optically coupled to the third optical communication assembly of the first branch optical transceiver. The second optical communication assembly is optically coupled to the third optical communication assembly of the second branch optical transceiver. The first exposed part corresponds to the first branch optical transceiver. The second exposed part corresponds to the second branch optical transceiver. The first exposed part and the second exposed part have different visual features.

19 Claims, 7 Drawing Sheets

OPTICAL MODULE ASSEMBLY INCLUDING EXPOSED PARTS HAVING DIFFERENT VISUAL FEATURES

CROSS-REFERENCE TO RELATED APPLICATIONS

This non-provisional application claims priority under 35 U.S.C. § 119(a) on Patent Application No(s). 202323346677.4 filed in China, on Dec. 8, 2023, the entire contents of which are hereby incorporated by reference.

BACKGROUND

1. Technical Field

The present disclosure relates to an optical module assembly, more particularly to an optical module assembly including exposed parts having different visual features.

2. Related Art

Optical modules may be used to transmit and/or receive optical signals for various applications including, without limitation, internet data center, cable TV and fiber to the home (FTTH). Optical modules provide higher speeds and wider bandwidth over longer distances. In order to promote the compatibility of products in global optical internet and reduce the maintenance burden, organizations such as Multi-Source Agreement (MSA), Institute of Electrical and Electronics Engineers (IEEE) and Optical Internetworking Forum (OIF) have defined various form factors applicable to different signal transmission rates. These form factors include, without limitation, XFP, SFP, QSFP (Quad Small Form Factor Pluggable), QSFP-DD (Double Density), OSFP (Octal Small Form Factor Pluggable) and CPO (Co-Packaged Optics).

Current optical modules have presented challenges, for example, with respect to maintaining optical efficiency (power), space management, thermal management, insertion loss, and manufacturing yield.

SUMMARY

According to one aspect of the present disclosure, an optical module assembly includes a root optical transceiver, a first branch optical transceiver, a second branch optical transceiver, a first exposed part and a second exposed part. The root optical transceiver includes a first housing, a first optical communication assembly and a second optical communication assembly. Each of the first branch optical transceiver and the second branch optical transceiver includes a second housing and a third optical communication assembly. The first optical communication assembly is optically coupled to the third optical communication assembly of the first branch optical transceiver. The second optical communication assembly is optically coupled to the third optical communication assembly of the second branch optical transceiver. The first exposed part corresponds to the first branch optical transceiver. The second exposed part corresponds to the second branch optical transceiver. The first exposed part and the second exposed part have different visual features.

According to another aspect of the present disclosure, an optical module assembly includes a root optical transceiver, a first branch optical transceiver, a second branch optical transceiver, an optical fiber assembly, a first exposed part and a second exposed part. Each of the first branch optical transceiver and the second branch optical transceiver includes a pull tab. The first branch optical transceiver and the second branch optical transceiver are optically coupled to the root optical transceiver. The optical fiber assembly includes a first optical fiber, a second optical fiber, a third optical fiber, a first sleeve and a second sleeve. The first optical fiber is optically coupled to the root optical transceiver. The second optical fiber is optically coupled to the first branch optical transceiver. The third optical fiber is optically coupled to the second branch optical transceiver. The first optical fiber is optically coupled to the second optical fiber and the third optical fiber. The first sleeve is sleeved on the second optical fiber. The second sleeve is sleeved on the third optical fiber. The first exposed part includes a tab portion located on the pull tab of the first branch optical transceiver and a sleeve portion located on the first sleeve. The second exposed part includes a tab portion located on the pull tab of the second branch optical transceiver and a sleeve portion located on the second sleeve. The tab portion of the first exposed part and the tab portion of the second exposed part have different visual features. The sleeve portion of the first exposed part and the sleeve portion of the second exposed part have different visual features.

According to still another aspect of the present disclosure, an optical module assembly includes a root optical transceiver, a first branch optical transceiver, a second branch optical transceiver, a first exposed part and a second exposed part. Each of the first branch optical transceiver and the second branch optical transceiver includes a pull tab. The root optical transceiver is optically coupled to the first branch optical transceiver and the second branch optical transceiver. Each of the first branch optical transceiver and the second branch optical transceiver has a first transmission rate. The root optical transceiver has a second transmission rate which is at least twice of the first transmission rate. At least portion of the first exposed part is located on the pull tab of the first branch optical transceiver. At least portion of the second exposed part is located on the pull tab of the second branch optical transceiver. The first exposed part and the second exposed part have different visual features.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
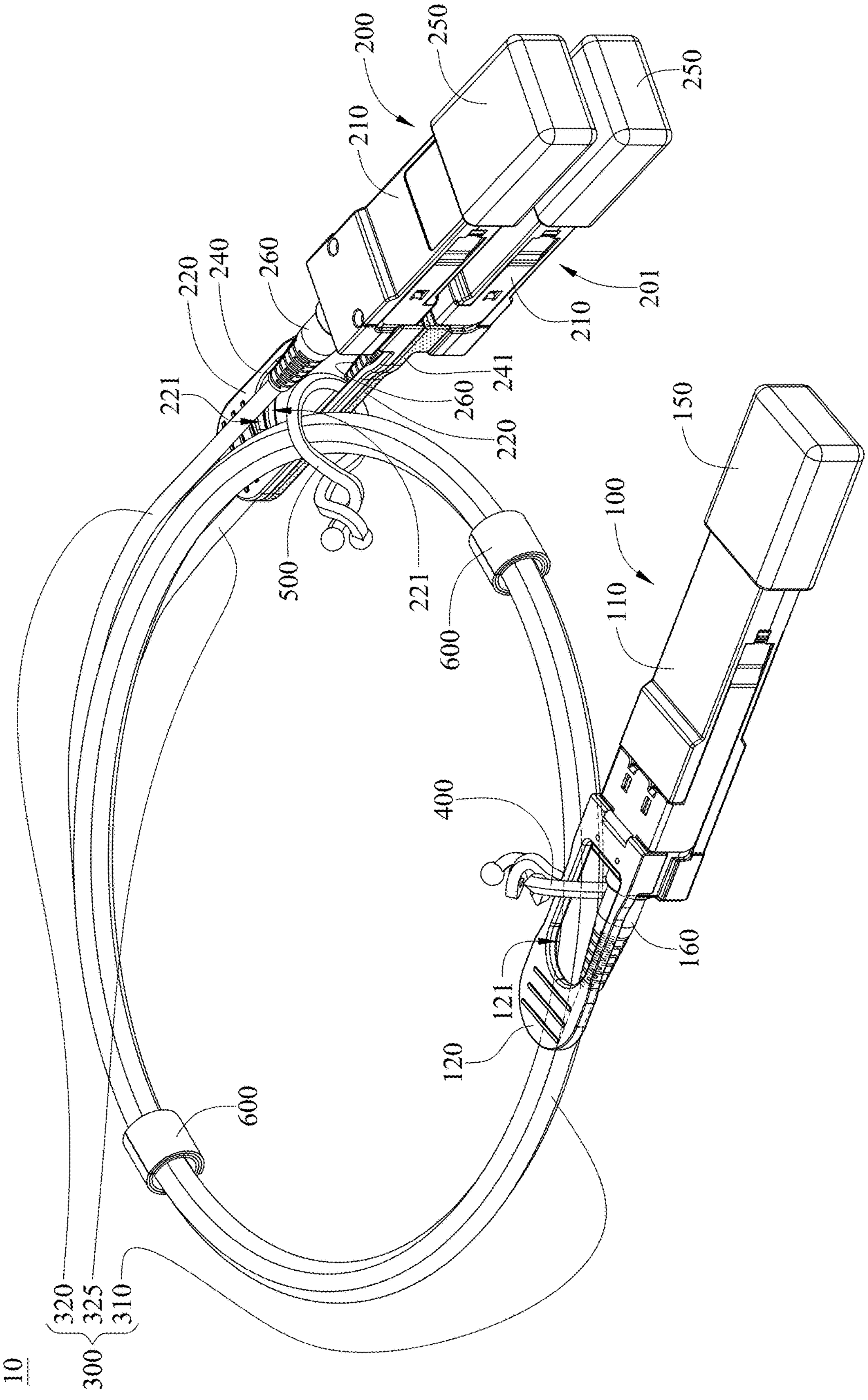
FIG. 1 is a perspective view of an optical module assembly according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In an optical module assembly, a breakout AOC (Active Optical Cable) may be used to optical couple a root optical transceiver to multiple branch optical transceivers, in which a transmission rate of the root optical transceiver is the sum of transmission rates of at least two of the branch optical transceivers. Also, the optical transceiver may include multiple optical communication assemblies optically coupled to optical communication assemblies of the branch optical transceivers, respectively. The branch optical transceivers may have different configurations. In addition, the optical communication assemblies of the root optical transceiver may have different configurations. However, such difference between the branch optical transceivers or the optical communication assemblies may not be recognized by the appearance of the optical module assembly including the same. Thus, the branch optical transceivers may be inserted into wrong ports on, for example, a data center switch, resulting in the malfunction of the optical module assembly.

According to one embodiment of the disclosure, the first exposed part and the second exposed part respectively corresponding to the first branch optical transceiver and the second branch optical transceiver may have different visual features. Thus, the first branch optical transceiver and the second branch optical transceiver may be easily recognized by the first exposed part and the second part. Thus, the first branch optical transceiver and the second branch optical transceiver may be prevented from being inserted into wrong ports, thereby preventing the malfunction of the optical module assembly.

According to one embodiment of the disclosure, the second optical fiber and the third optical fiber may be optically coupled to the third optical communication assembly of the first branch optical transceiver and the third optical communication assembly of the second branch optical transceiver, respectively. The first sleeve and the second sleeve may be sleeved on the second optical fiber and the third optical fiber, respectively. Also, the sleeve portion of the first exposed part and the sleeve portion of the second exposed part may have different visual feature. Thus, the recognition of the first branch optical transceiver and the second branch optical transceiver may be facilitated.

Further, the tab portion of the first exposed part and the tab portion of the second exposed part may have different visual features. Thus, the recognition of the first branch optical transceiver and the second branch optical transceiver may be further facilitated regardless of the tangle of the optical fiber assembly or the covering of the management structure for the optical fiber assembly.

Some or all of technical features disclosed in one or more embodiments of the present disclosure may be combined and configured to achieve corresponding effects. The term “coupled”, “coupling” or “couple” as used herein refers to any connection, link or the like. Such “coupled” components are not necessarily directly connected to one another and may be separated by intermediate components unless otherwise provided by the present disclosure.

The term “channel” as used herein refers to optical channel(s) for transmitting or receiving signals related to channel wavelength. The channel wavelengths may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid.

Figure 2:
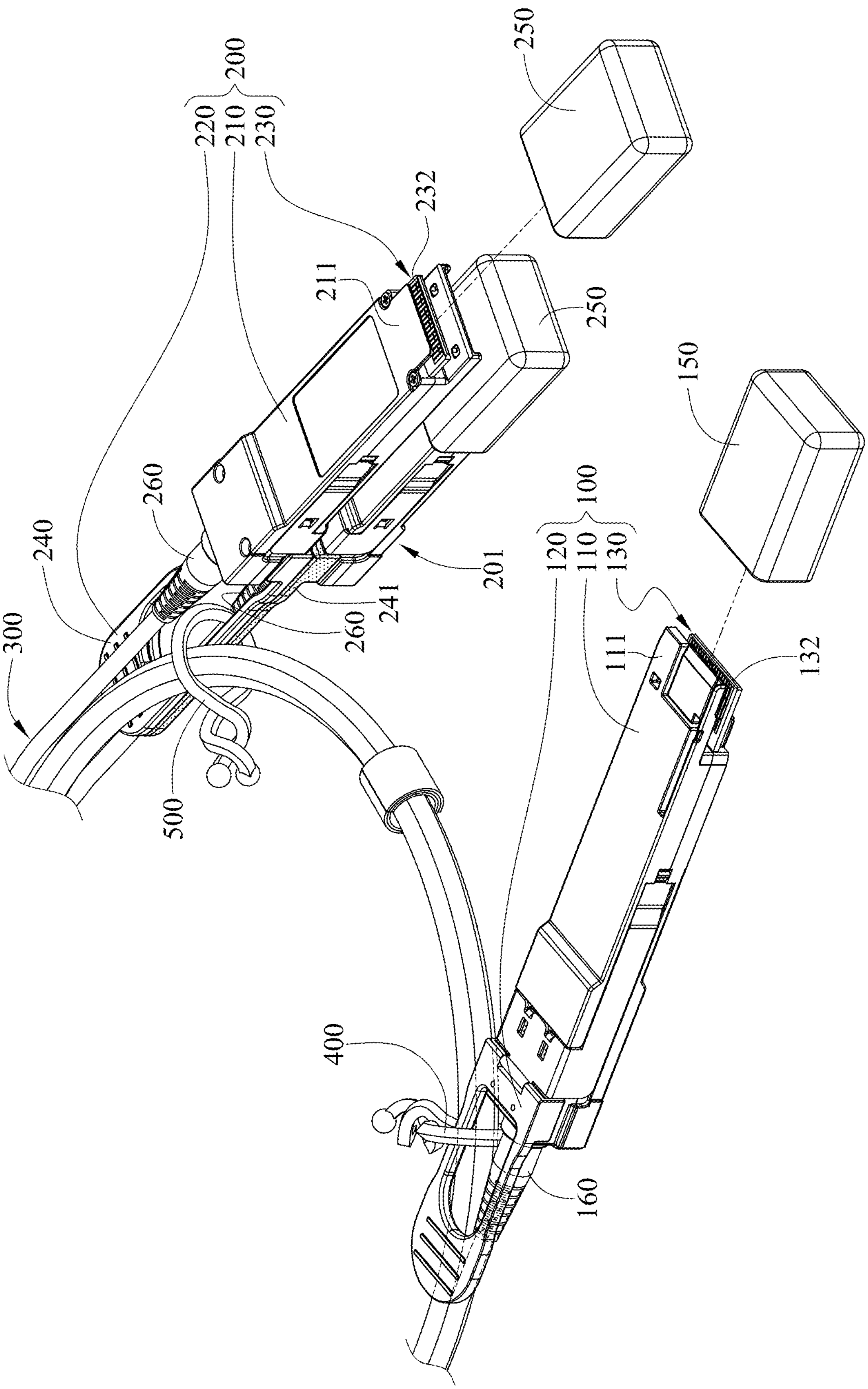
FIG. 2 is an exploded view of the optical module assembly in FIG. 1.
Figure 3:
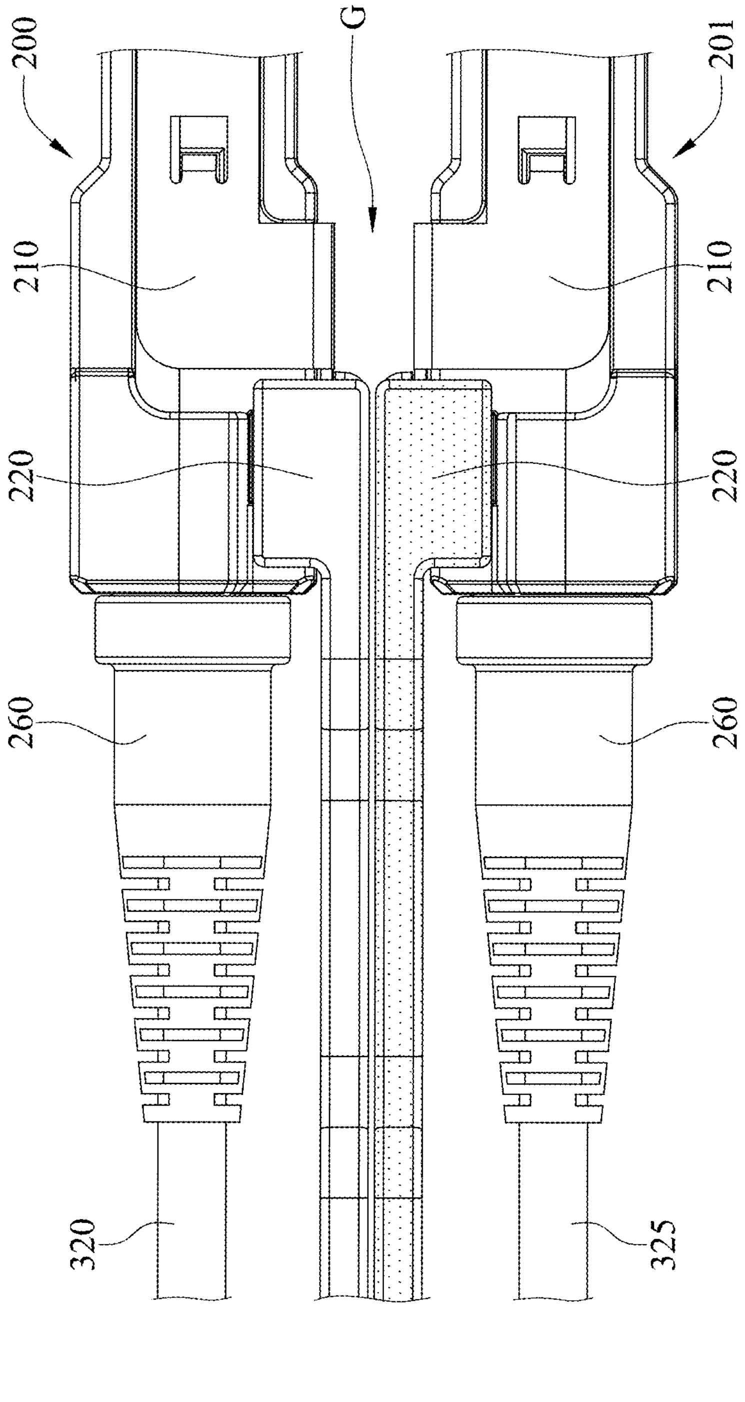
FIG. 3 is a side view of the optical module assembly in FIG. 1.

Please refer to FIGS. 1 to 3. FIG. 1 is a perspective view of an optical module assembly 10 according to one embodiment of the present disclosure. FIG. 2 is an exploded view of the optical module assembly 10 in FIG. 1. FIG. 3 is a side view of the optical module assembly 10 in FIG. 1.

In this embodiment, the optical module assembly 10 may include a root optical transceiver 100, a first protective cover 150, a first boot 160, a first branch optical transceiver 200, a second branch optical transceiver 201, a plurality of second protective covers 250, a plurality of second boots 260, an optical fiber assembly 300, a first fixing ring 400, and a second fixing ring 500.

The root optical transceiver 100 may include a first housing 110, a slider, a first pull tab 120 and a first circuit board assembly 130. The slider may be movably disposed on the first housing 110. The first pull tab 120 may be disposed on the slider and may have a first opening 121. The first circuit board assembly 130 may be disposed in the first housing 110. The first housing 110 may have a first plugging end part 111 located away from the first pull tab 120. The detailed structure of the first circuit board assembly 130 will be described later. A first connecting port 132 of the first circuit board assembly 130 may be exposed from the first plugging end part 111. The first protective cover 150 may be covered on the first plugging end part 111. The first boot 160 may be disposed on a side of the first housing 110.

Each of the first branch optical transceiver 200 and the second branch optical transceiver 201 may include a second housing 210, a slider, a second pull tab 220 and a second circuit board assembly 230. In each of the first branch optical transceiver 200 and the second branch optical transceiver 201, The slider may be movably disposed on the first housing 110. The second pull tab 220 may be disposed on the slider and may have a second opening 221. The second circuit board assembly 230 may be disposed in the second housing 210. The second housing 210 may have a second plugging end part 211 located away from the second pull tab 220. The detailed structure of the second circuit board assembly 230 will be described later. A second connecting port 232 of the second circuit board assembly 230 may be exposed from the second plugging end part 211. The second protective covers 250 may be covered on the second plugging end parts 211 of the second housings 210, respectively. The second boots 260 may be disposed on sides of the second housings 210, respectively.

In one embodiment, the housing of the optical transceiver may be a hermetic or a non-hermetic box for accommodating transmit optical subassembly (TOSA) module and/or receive optical subassembly (ROSA) module. In one embodiment, the housing of the optical transceiver may include multiple parts which are assembled together.

In one embodiment, the slider of the optical transceiver may be fastened to a cage for accommodating at least part of the housing. In one embodiment, the pull tab may be pivotally connected to the slider on the housing. The pivotal connection between the first pull tab 120 and the first housing 110 and that between the second pull tab 220 and the second housing 210 may improve the convenience for using or manufacturing the optical module assembly 10. In one embodiment, the pull tab may be fixed to the slider and made of flexible material.

In one embodiment, the plugging end part of the housing may be an end having an opening which exposes the circuit board assembly. In one embodiment, the plugging end part of the housing may allow the circuit board assembly to be electrically coupled to a circuitry located in the cage.

In this embodiment, the first branch optical transceiver 200 and the second branch optical transceiver 201 may be spaced apart from each other by a gap G. Each of the second pull tab 220 may at least partially be located in the gap G. That is, the first branch optical transceiver 200 and the second branch optical transceiver 201 may be arranged in a back to back manner. In this way, the contact and thus the wear, the scratch or the damage between the first housing 110 and the second housings 210 may be prevented, thereby enhancing the reliability of the first housing 110 and the second housings 210.

With the cooperation of the root optical transceiver 100 having higher transmission rate and the first branch optical transceiver 200 and the second branch optical transceiver 201 having lower transmission rate, the flexibility of the signal transfer may be enhanced.

In this embodiment, the optical fiber assembly 300 may include a first optical fiber 310, a second optical fiber 320 and a third optical fiber 325. The first optical fiber 310 may be optically coupled to the root optical transceiver 100. The second optical fiber 320 may be optically coupled to the first branch optical transceiver 200, and the third optical fiber 325 may be optically coupled to the second branch optical transceiver 201. In one embodiment, the first optical fiber 310 may be optically coupled to the first circuit board assembly 130, the second optical fiber 320 may be optically coupled to the second circuit board assembly 230 of the first branch optical transceiver 200, and the third optical fiber 325 may be optically coupled to the second circuit board assembly 230 of the second branch optical transceiver 201. The first optical fiber 310 may be optically coupled to the second optical fiber 320 and the third optical fiber 325. In one embodiment, the optical fiber of the optical fiber assembly may include single fiber core. In one embodiment, the optical fiber of the optical fiber assembly may be a cable including multiple fiber cores.

In addition, the first optical fiber 310 may be disposed through the first boot 160. The second optical fiber 320 and the third optical fiber 325 may be disposed through the second boots 260, respectively. The first optical fiber 310, the second optical fiber 320 and the third optical fiber 325 may be winded to be in a ring shape. The first boot 160 may prevent a part where the first optical fiber 310 and the first housing 110 are connected from being damaged during transportation or usage. Also, the second boot 260 may prevent a part where the second optical fiber 320 or the third optical fiber 325 and the second housing 210 are connected from being damaged during transportation or usage. Accordingly, the reliability and stability of the root optical transceiver 100, the first branch optical transceiver 200 and the second branch optical transceiver 201 may be improved. Furthermore, the size of the first boot 160 or the second boot 260 may be reduced without reducing the reliability and stability, thereby lowering the manufacture cost. The length of the first optical fiber 310, the second optical fiber 320 or the third optical fiber 325 may be adjusted according to actual requirements to allow the same to be adapted to different application.

The first fixing ring 400 may be disposed through the first opening 121 of the first pull tab 120, and may be sleeved on the first optical fiber 310, the second optical fiber 320 and the third optical fiber 325, thereby simplifying the process for fixing the optical fiber assembly 300 to the first pull tab 120 or the second pull tabs 220. The second fixing ring 500 may be disposed through the second openings 221 of the second pull tabs 220, and may be sleeved on the first optical fiber 310, the second optical fiber 320 and the third optical fiber 325. In this embodiment, the first fixing ring 400 and the second fixing ring 500 may be cable ties. Thus, after being disposed through the first opening 121 or the second openings 221, the optical fiber assembly 300 may be fixed to the first pull tab 120 or the second pull tabs 220 merely by twisting end parts of the first fixing ring 400 or the second fixing ring 500. In other embodiments, the optical module assembly may not include the first fixing ring and/or the second fixing ring.

The first opening 121 and the second opening 221 not only may be used for fixing the first fixing ring 400 and the second fixing ring 500, but also may allow a finger of a user to be inserted therein to manipulate the first pull tab 120 or the second pull tab 220. Also, the cost of the material is reduced due to the first opening 121 and the second opening 221.

In this embodiment, the optical module assembly 10 may further include two hook and loop fasteners 600. The two hook and loop fasteners 600 may be spaced apart from each other. In addition, the two hook and loop fasteners 600 may be sleeved on the first optical fiber 310, the second optical fiber 320 and the third optical fiber 325, but may be spaced apart from the first fixing ring 400 and the second fixing ring 500. In other embodiments, the optical module assembly may include one hook and loop fastener 600 or may not include the hook and loop fasteners 600.

Figure 4:
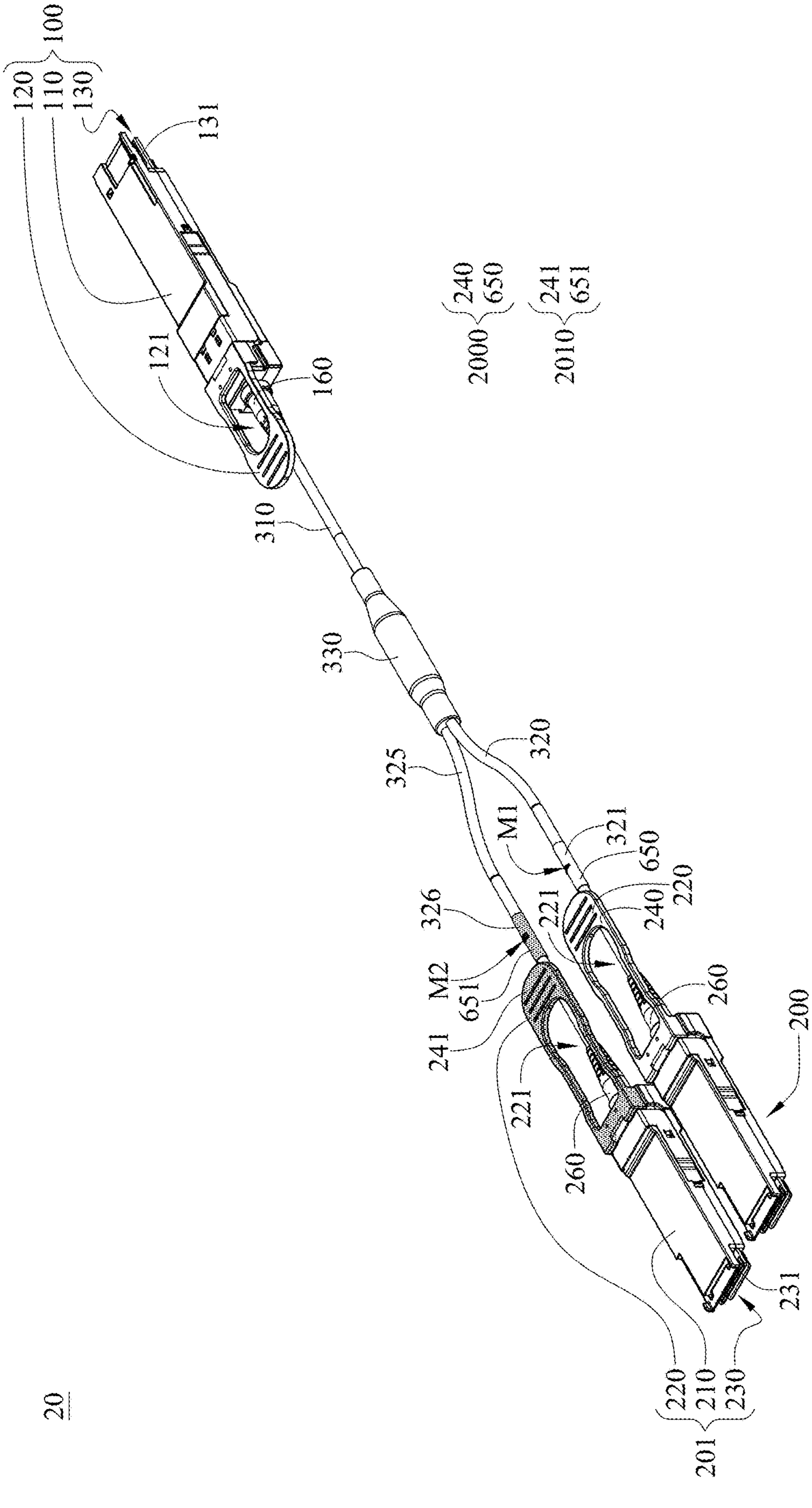
FIG. 4 is a perspective view of the optical module assembly in FIG. 1 that is in use.

Please refer to FIG. 4. FIG. 4 is a perspective view of the optical module assembly 10 in FIG. 1 that is in use. After removing the first protective cover 150, the second protective covers 250, the first fixing ring 400, the second fixing ring 500 and the hook and loop fasteners 600 in FIG. 1, the first optical fiber 310 may be optically coupled to the second optical fiber 320 and the third optical fiber 325 via an optical fiber splitter 330, and a first sleeve 321 and a second sleeve 326 may be sleeved on the second optical fiber 320 and the third optical fiber 325, respectively. In this way, the root optical transceiver 100, the first boot 160, the first branch optical transceiver 200, the second branch optical transceivers 201, the second boots 260, the optical fiber assembly 300, the first sleeve 321, the second sleeve 326 and the optical fiber splitter 330 may together configure an optical module assembly 20 such as an AOC optical module. In one embodiment, the optical fiber splitter 330 may include a cable management device. In one embodiment, the optical fiber splitter 330 may include an optical multiplexer or an optical demultiplexer.

In this embodiment, the optical module assembly 10 may further include a first exposed part 2000 and a second exposed part 2010. The first exposed part 2000 may correspond to the first branch optical transceiver 200. The second exposed part 2010 may correspond to the second branch optical transceiver 201. At least portion of the first exposed part 2000 may be located on the second pull tab 220 of the first branch optical transceiver 200. At least portion of the second exposed part 2010 may be located on the second pull tab 220 of the second branch optical transceiver 201. At least portion of the first exposed part 2000 may be located on the first sleeve 321. At least portion of the second exposed part 2010 may be located on the second sleeve 326. In one embodiment, the first exposed part 2000 may include a tab portion 240 located on the second pull tab 220 of the first branch optical transceiver 200 and a sleeve portion 650 located on the first sleeve 321. In one embodiment, the second exposed part 2010 may include a tab portion 241 located on the second pull tab 220 of the second branch optical transceiver 201 and a sleeve portion 651 located on the second sleeve 326.

The first exposed part 2000 and the second exposed part 2010 may have different visual features. For example, the first exposed part 2000 and the second exposed part 2010 may be in different colors. Thus, the first branch optical transceiver 200 and the second branch optical transceiver 201 may be recognized in a directly and fast manner, thereby lowering the cost for manufacturing and using the optical module assembly 10.

The tab portion 240 and the sleeve portion 650 of the first exposed part 2000 may have identical visual feature. For example, the tab portion 240 and the sleeve portion 650 of the first exposed part 2000 may be in an identical color. The tab portion 241 and the sleeve portion 651 of the second exposed part 2010 may have identical visual feature. For example, the tab portion 241 and the sleeve portion 651 of the second exposed part 2010 may be in an identical color. The tab portion 240 of the first exposed part 2000 and the tab portion 241 of the second exposed part 2010 may have different visual features, and the sleeve portion 650 of the first exposed part 2000 and the sleeve portion 651 of the second exposed part 2010 may have different visual features. For example, the tab portion 240 of the first exposed part 2000 and the tab portion 241 of the second exposed part 2010 may be in different colors, and the sleeve portion 650 of the first exposed part 2000 and the sleeve portion 651 of the second exposed part 2010 may be in different colors. Due to the aforementioned design of visual features (e.g., color), the recognition may be further facilitated and a mistake proofing function may be provided.

The first sleeve 321 may have a first mark M1. The second sleeve may have a second mark M2. The first mark M1 may be different from the second mark M2. Thus, the second optical fiber 320 and the third optical fiber 325 may be recognized in a directly and fast manner, thereby lowering the cost for manufacturing and using the optical module assembly 20.

Note that the visual difference between the first exposed part 2000 and the second exposed part 2010 are not limited to be in different colors. In other embodiments, the first exposed part and the second exposed part may have different visual features by having different shapes, having different sizes, having different depths of engraving, or having different textures such as different roughness, having different optical transparency, or having different reflectance. Note that the tab portions of different exposed parts or the sleeve portion of different exposed parts are not limited to having different visual features by being in different colors, either. The tab portions of different exposed parts may have different pull tab shapes, different pull tab sizes, different depths of engraving thereon, different textures such as different roughness thereof, different optical transparency thereof, or different reflectance thereof.

Figure 5:
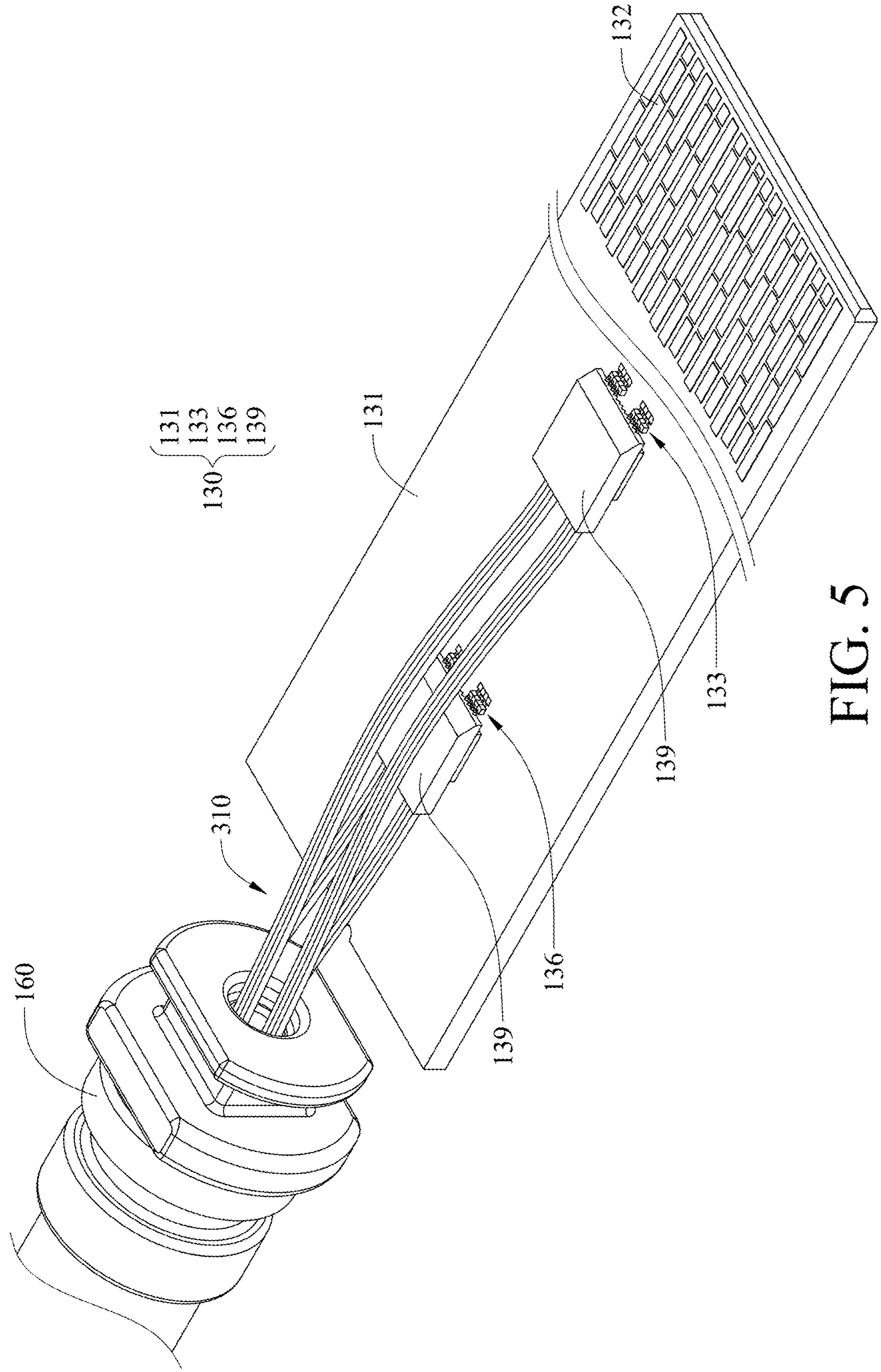
FIGS. 5 and 6 are perspective views of a root optical transceiver of the optical module assembly in FIG. 4 omitting a first housing.
Figure 6:
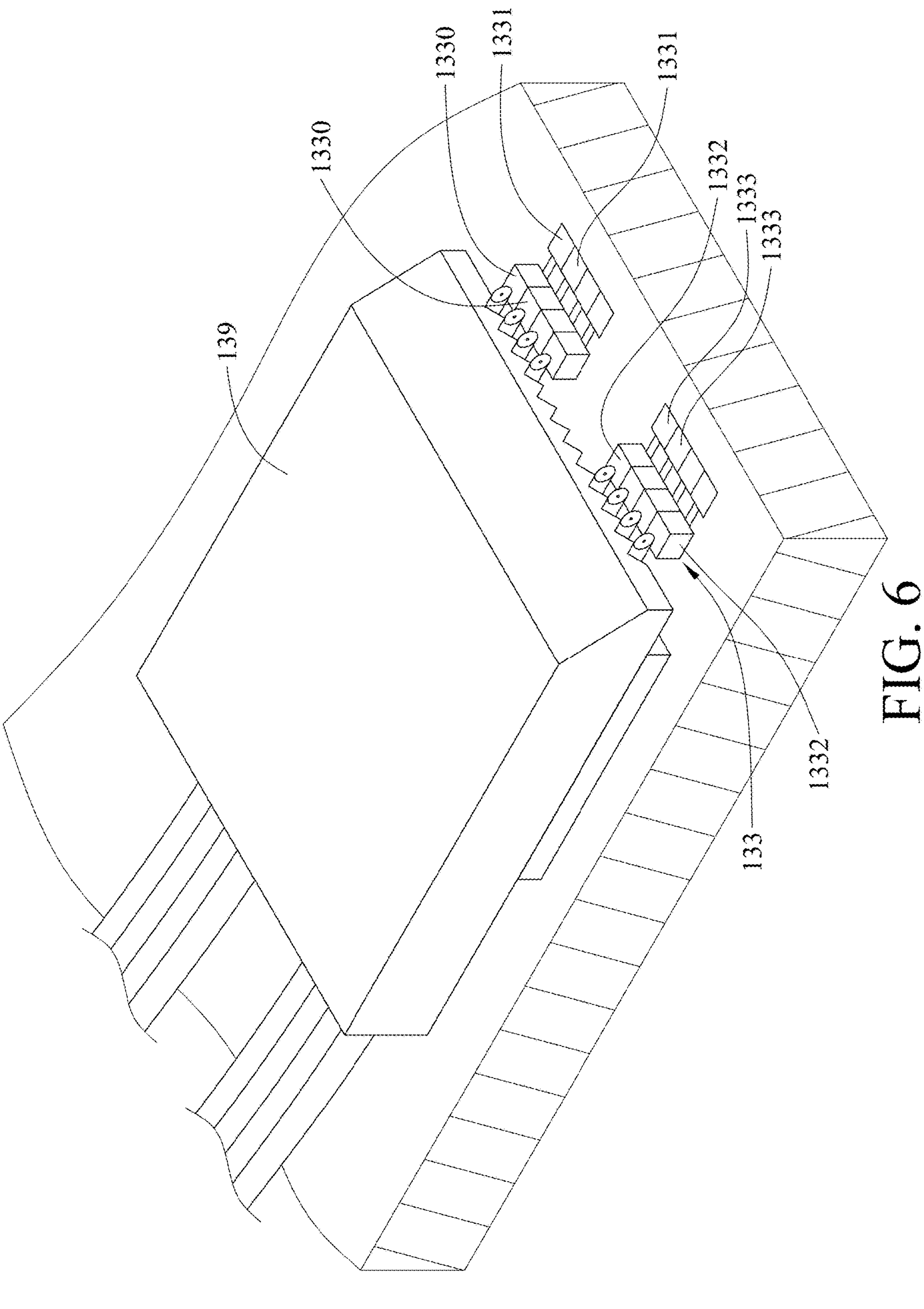
Figure 7:
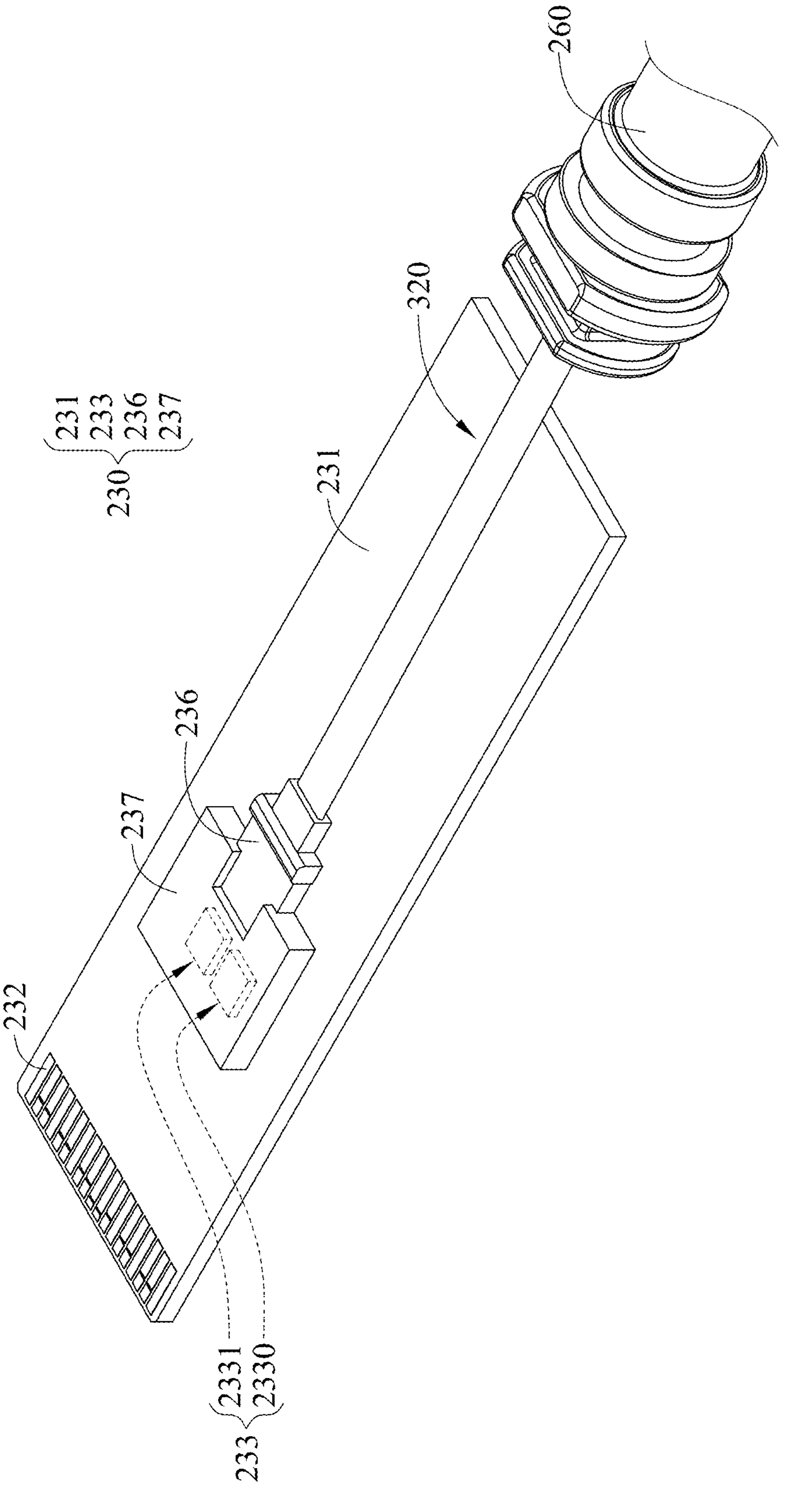
FIG. 7 is a perspective view of a first branch optical transceiver of the optical module assembly in FIG. 4 omitting a second housing.

Hereinafter, the detailed structure of the first circuit board assembly 130 and that of the second circuit board assembly 230 will be described later. Please refer to FIGS. 4-6. FIGS. 5 and 6 are perspective views of a root optical transceiver 100 of the optical module assembly 20 in FIG. 4 omitting a first housing 110. FIG. 7 is a perspective view of the first branch optical transceiver 200 of the optical module assembly 20 in FIG. 4 omitting the second housing 210.

First, please refer to FIGS. 4-6. In this embodiment, the first circuit board assembly 130 may include a circuit board 131, a first optical communication assembly 133, a second optical communication assembly 136, and two optical fiber arrays 139.

The first connecting port 132 may be a part of the circuit board 131 where multiple gold fingers are disposed. In one embodiment, the connecting port of the circuit board assembly may be interpreted as an electrically coupling part of the circuit board assembly for transmitting electrical signals.

The first optical communication assembly 133 may be disposed on and electrically connected to the circuit board 131. The first optical communication assembly 133 may include four lasers 1330, four drivers 1331, four photodiodes 1332 and four transimpedance amplifiers (TIA) 1333. The driver 1331 may be disposed adjacent to the laser 1330 and configured to drive the laser 1330. The drivers 1331 and the lasers 1330 may configure a TOSA module. The TIA 1333 may be disposed adjacent to the photodiode 1332 and configured to amplify the electrical signal output by the photodiode 1332. The TIAs 1333 and the photodiodes 1332 may configure a ROSA module. That is, the first optical communication assembly 133 may be understood as including four TOSA modules and four ROSA modules, or may be understood as having four channels.

The second optical communication assembly 136 may be similar to the first optical communication assembly 133 in structure, and thus the repeated descriptions will be omitted. The first optical communication assembly 133 and the second optical communication assembly 136 are disposed in the first housing 110 at different positions.

In one embodiment, the first optical communication assembly 133 and the second optical communication assembly 136 may be interpreted as an integrated optical communication assembly. For example, there may be eight lasers arranged side by side on the circuit board, wherein four of the eight lasers may configure a TOSA module of the first optical communication assembly, and the other four lasers may configure a TOSA module of the second optical communication assembly.

The two optical fiber arrays 139 are disposed adjacent to the first optical communication assembly 133 and the second optical communication assembly 136, respectively.

The first optical fiber 310 may be optically coupled to the first optical communication assembly 133 and the second optical communication assembly 136.

There may be one or more differences between the first optical communication assembly 133 and the second optical communication assembly 136 that are unable to be recognized by the appearance of the root optical transceiver 100, and such kinds of difference may be interpreted as non-visual features with respect to the aforementioned visual features. For example, the optical fiber optically coupled to the first optical communication assembly 133 may be shorter or longer than the optical fiber optically coupled to the second optical communication assembly 136; the first optical communication assembly 133 and the second optical communication assembly 136 may have different amounts of channels; the first optical communication assembly 133 and the second optical communication assembly 136 may have TOSAs of different configurations (e.g., one with VSCEL and fiber array, and the other with laser diode and isolator); the first optical communication assembly 133 and the second optical communication assembly 136 may have ROSAs of different configurations (e.g., one with TIA having higher current, and the other with TIA having lower current).

Next, please refer to FIGS. 4 and 7. In this embodiment, the second circuit board assembly 230 may include a circuit board 231, a third optical communication assembly 233, a ferrule 236 and a lens 237.

The second connecting port 232 may be a part of the circuit board 231 where multiple gold fingers are disposed. the connecting port of the circuit board assembly may be interpreted as an electrically coupling part of the circuit board assembly for transmitting electrical signals.

The third optical communication assembly 233 may be disposed on and electrically connected to the circuit board 231. The third optical communication assembly 233 may include a TOSA 2330 and a ROSA 2331. The ferrule 236 may be disposed on a side of the third optical communication assembly 233. The lens 237 may be covered on the third optical communication assembly 233.

The second optical fiber 320 may be optically coupled to the third optical communication assembly 233 of the first branch optical transceiver 200. Although not shown in the drawing, a person ordinarily skilled in the art may easily understand that the third optical fiber 325 may be optically coupled to the third optical communication assembly 233 of the second branch optical transceiver 201.

In this embodiment, a transmission rate of the first branch optical transceiver 200 may be identical with a transmission rate of the second branch optical transceiver 201. For example, each of the first branch optical transceiver 200 and the second branch optical transceiver 201 may have a first transmission rate, and the root optical transceiver 100 may have a second transmission rate which is at least twice of the first transmission rate. For example, the first transmission rate may be 100 Gbps and the second transmission rate may be 200 Gbps. In one embodiment, the optical module assembly may be a Y-cable breakout AOC including a root optical transceiver of 200 Gbps and two branch optical transceivers of 100 Gbps. In one embodiment, the optical module assembly may be a Y-cable breakout AOC including a root optical transceiver of 800 Gbps and two branch optical transceivers of 400 Gbps. In one embodiment, the optical module assembly may be a breakout AOC including a root optical transceiver of 100 Gbps and four branch optical transceivers of 25 Gbps.

There may be one or more differences between the first branch optical transceiver 200 and the second branch optical transceiver 201 that are unable to be recognized by their appearance, and such kinds of difference may be interpreted as non-visual features with respect to the aforementioned visual features.

In one embodiment, an intermediate optical fiber in the housing of the first branch optical transceiver 200 may be shorter or longer than an intermediate optical fiber in another housing, which is in the housing of the second branch optical transceiver 201, and the difference in fiber length may be interpreted as a non-visual feature.

In one embodiment, the first branch optical transceiver 200 and the second branch optical transceiver 201 may have identical transmission rate but different amounts of channels, and the difference in channel quantity may be interpreted as a non-visual feature.

In one embodiment, the first branch optical transceiver 200 and the second branch optical transceiver 201 may have different TOSA configurations, and the difference in TOSA configuration may be interpreted as a non-visual feature. For example, the TOSA module in the first branch optical transceiver 200 may include VSCELs and a fiber array, and the TOSA module in the second branch optical transceiver 201 may include EMLs and an optical multiplexer.

In one embodiment, the first branch optical transceiver 200 and the second branch optical transceiver 201 may have different ROSA configurations, and the difference in ROSA configuration may be interpreted as a non-visual feature. For example, the ROSA module in the first branch optical transceiver 200 may include a fiber array, and the ROSA module in the second branch optical transceiver 201 may include an optical demultiplexer.

In one embodiment, the electrically coupling gold fingers in the first branch optical transceiver 200 and the second branch optical transceiver 201 may have different patterns, and the difference in gold finger patterns may be interpreted as a non-visual feature. For example, the first branch optical transceiver may include gold fingers adapted to a first type of data center switch, and the second branch optical transceiver may include gold fingers adapted to a second type of data center switch.

In one embodiment, the second housings 210 of the first branch optical transceiver 200 and the second branch optical transceiver 201 may have different shapes of connecting port, and the difference in the shapes of connecting port may be interpreted as a non-visual feature. For example, the housing of the first branch optical transceiver may include a connecting port adapted to a first type of data center switch port, and the second branch optical transceiver may include a connecting port adapted to a second type of data center switch port.

In one embodiment, one of the first branch optical transceiver 200 and the second branch optical transceiver 201 may include EMI shielding structure disposed therein and the other may not. The difference in the existence of EMI shielding structure may be interpreted as a non-visual feature.

According to one embodiment of the disclosure, the first exposed part and the second exposed part respectively corresponding to the first branch optical transceiver and the second branch optical transceiver may have different visual features. The first branch optical transceiver and the second branch optical transceiver may easily be recognized by the first exposed part and the second part. Thus, the first branch optical transceiver and the second branch optical transceiver may be prevented from being inserted into wrong ports, thereby preventing the malfunction of the optical module assembly.

According to one embodiment of the disclosure, the second optical fiber and the third optical fiber are optically coupled to the third optical communication assembly of the first branch optical transceiver and the third optical communication assembly of the second branch optical transceiver, respectively. The first sleeve and the second sleeve are sleeved on the second optical fiber and the third optical fiber, respectively. Also, the sleeve portion of the first exposed part and the sleeve portion of the second exposed part may have different visual feature. Thus, the recognition of the first branch optical transceiver and the second branch optical transceiver may be facilitated.

According to one embodiment of the disclosure, the tab portion of the first exposed part and the tab portion of the second exposed part may have different visual features. Thus, the recognition of the first branch optical transceiver and the second branch optical transceiver may be further facilitated regardless of the tangle of the optical fiber assembly or the covering of the management structure for the optical fiber assembly.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical module assembly, comprising:

a root optical transceiver, comprising a first housing, a first optical communication assembly and a second optical communication assembly;

a first branch optical transceiver and a second branch optical transceiver, wherein each of the first branch optical transceiver and the second branch optical transceiver comprises a second housing and a third optical communication assembly, the first optical communication assembly is optically coupled to the third optical communication assembly of the first branch optical transceiver, and the second optical communication assembly is optically coupled to the third optical communication assembly of the second branch optical transceiver; and a first exposed part including at least a tab portion located on a pull tab of the first branch optical transceiver and a second exposed part including at least a tab portion located on a pull tab of the second branch optical transceiver, wherein the tab portion of the first exposed part and the tab portion of the second exposed part have different visual features including at least one of different colors, different shapes, different sizes, different depths of engraving, different roughnesses, different optical transparencies, or different reflectances;

wherein a transmission rate of the first branch optical transceiver is identical with a transmission rate of the second branch optical receiver.

2. The optical module assembly according to claim 1, further comprising an optical fiber assembly, wherein the optical fiber assembly comprises a first optical fiber, a second optical fiber, a third optical fiber, a first sleeve and a second sleeve, the first optical fiber is optically coupled to the first optical communication assembly and the second optical communication assembly, the second optical fiber is optically coupled to the third optical communication assembly of the first branch optical transceiver, the third optical fiber is optically coupled to the third optical communication assembly of the second branch optical transceiver, the first optical fiber is optically coupled to the second optical fiber and the third optical fiber, the first sleeve is sleeved on the second optical fiber, the second sleeve is sleeved on the third optical fiber, the first exposed part further includes a sleeve portion located on the first sleeve, and the second exposed part further includes a sleeve portion located on the second sleeve.

3. The optical module assembly according to claim 2, wherein the sleeve portion of the first exposed part and the sleeve portion of the second exposed part have different visual features including at least one of different colors, different shapes, different sizes, different depths of engraving, different roughnesses, different optical transparencies, or different reflectances.

4. The optical module assembly according to claim 2, wherein the sleeve portion of the first exposed part has a first mark, the sleeve portion of the second exposed part has a second mark, and the first mark is different from the second mark.

5. The optical module assembly according to claim 2, wherein the tab portion of the first exposed part and the sleeve portion of the first exposed part have an identical visual feature including at least one of identical color, identical roughness, identical optical transparency, or identical reflectance, and the tab portion of the second exposed part and the sleeve portion of the second exposed part have an identical visual feature including at least one of identical color, identical roughness, identical optical transparency, or identical reflectance.

6. The optical module assembly according to claim 1, further comprising an optical fiber assembly and a first fixing ring, wherein the optical fiber assembly is optically coupled to the first optical communication assembly, the second optical communication assembly, and the third optical communication assemblies of the first branch optical transceiver and the second branch optical transceiver, the root optical transceiver further comprises a pull tab having a first opening, each of the pull tabs of the first branch optical transceiver and the second branch optical transceiver having a second opening, the first fixing ring is disposed through the first opening or the second openings of the pull tabs of the first branch optical transceiver and the second branch optical transceiver, and the first fixing ring is sleeved on the optical fiber assembly.

7. The optical module assembly according to claim 6, further comprising a second fixing ring, wherein the first fixing ring is disposed through the first opening, and the second fixing ring is disposed through the second openings of the pull tabs of the first branch optical transceiver and the second branch optical transceiver and is sleeved on the optical fiber assembly.

8. The optical module assembly according to claim 6, wherein the second housing of the first branch optical transceiver and the second housing of the second branch optical transceiver are spaced apart from each other by a gap, and the pull tab of the first branch optical transceiver and the pull tab of the second branch optical transceiver are at least partially located in the gap.

9. The optical module assembly according to claim 1, wherein in an unplugged state of the first and second branch optical transceivers, the tab portions of the first and second exposed parts have the at least one of different colors, different shapes, different sizes, different depths of engraving, different roughnesses, different optical transparencies, or different reflectance.

10. An optical module assembly, comprising:

a root optical transceiver;

a first branch optical transceiver and a second branch optical transceiver, wherein each of the first branch optical transceiver and the second branch optical transceiver comprises a pull tab, the first branch optical transceiver and the second branch optical transceiver are optically coupled to the root optical transceiver;

an optical fiber assembly, comprising a first optical fiber, a second optical fiber, a third optical fiber, a first sleeve and a second sleeve, wherein the first optical fiber is optically coupled to the root optical transceiver, the second optical fiber is optically coupled to the first branch optical transceiver, the third optical fiber is optically coupled to the second branch optical transceiver, the first optical fiber is optically coupled to the second optical fiber and the third optical fiber, the first sleeve is sleeved on the second optical fiber, the second sleeve is sleeved on the third optical fiber; and a first exposed part and a second exposed part, wherein the first exposed part comprises a tab portion located on the pull tab of the first branch optical transceiver and a sleeve portion located on the first sleeve, and the second exposed part comprises a tab portion located on the pull tab of the second branch optical transceiver and a sleeve portion located on the second sleeve;

wherein a transmission rate of the first branch optical transceiver is identical with a transmission rate of the second branch optical transceiver, the tab portion of the first exposed part and the tab portion of the second exposed part have different colors, and the sleeve portion of the first exposed part and the sleeve portion of the second exposed part have different colors.

11. The optical module assembly according to claim 10, wherein the tab portion of the first exposed part and the sleeve portion of the first exposed part have an identical color, and the tab portion of the second exposed part and the sleeve portion of the second exposed part have an identical color.

12. The optical module assembly according to claim 10, wherein in an unplugged state of the first and second branch optical transceivers, the tab portion of the first exposed part and the tab portion of the second exposed part have different colors, and the sleeve portion of the first exposed part and the sleeve portion of the second exposed part have different colors.

13. The optical module assembly according to claim 10, wherein the sleeve portion of the first exposed part has a first mark, the sleeve portion of the second exposed part has a second mark, and the first mark is different from the second mark.

14. An optical module assembly, comprising:

a root optical transceiver;

a first branch optical transceiver and a second branch optical transceiver, wherein each of the first branch optical transceiver and the second branch optical transceiver comprises a pull tab, the root optical transceiver is optically coupled to the first branch optical transceiver and the second branch optical transceiver, each of the first branch optical transceiver and the second branch optical transceiver has an identical first transmission rate, and the root optical transceiver has a second transmission rate which is at least twice of the first transmission rate; and a first exposed part and a second exposed part, wherein at least portion of the first exposed part is located on the first branch optical transceiver, at least portion of the second exposed part is located on the second branch optical transceiver, and the first exposed part and the second exposed part have different visual features including at least one of different colors, different shapes, different sizes, different depths of engraving, different roughnesses, different optical transparencies, or different reflectances in an unplugged state of the first and second branch optical transceivers.

15. The optical module assembly according to claim 14, wherein the first exposed part and the second exposed part are in different colors.

16. The optical module assembly according to claim 14, further comprising an optical fiber assembly, wherein the optical fiber assembly comprises a first optical fiber optically coupled to the first branch optical transceiver, a second optical fiber optically coupled to the second branch optical transceiver, a first sleeve sleeved on the first optical fiber, and a second sleeve sleeved on the second optical fiber, at least portion of the first exposed part is located on the first sleeve, and at least portion of the second exposed part is located on the second sleeve.

17. The optical module assembly according to claim 16, wherein the first exposed part comprises a tab portion located on the pull tab of the first branch optical transceiver and a sleeve portion located on the first sleeve, the second exposed part comprises a tab portion located on the pull tab of the second branch optical transceiver and a sleeve portion located on the second sleeve, the tab portion of the first exposed part and the tab portion of the second exposed part have different colors in the unplugged state of the first and second branch optical transceivers, and the sleeve portion of the first exposed part and the sleeve portion of the second exposed part have different colors in the unplugged state of the first and second branch optical transceivers.

18. The optical module assembly according to claim 17, wherein the tab portion of the first exposed part and the sleeve portion of the first exposed part have an identical color, and the tab portion of the second exposed part and the sleeve portion of the second exposed part have an identical color.

19. The optical module assembly according to claim 17, wherein the sleeve portion of the first exposed part has a first mark, the sleeve portion of the second exposed part has a second mark, and the first mark is different from the second mark.

* * * * *